United States Patent
Davis (10) Patent No.: US 12,248,453 B2
(45) Date of Patent: *Mar. 11, 2025

(54) METHOD AND SYSTEM FOR DISTRIBUTED DATA STORAGE WITH ETERNAL INTEGRITY GUARANTEES

(71) Applicant: MASTERCARD INTERNATIONAL INCORPORATED, Purchase, NY (US)

(72) Inventor: Steven C. Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/579,017

(22) Filed: Jan. 19, 2022

(65) Prior Publication Data
US 2022/0138172 A1    May 5, 2022

Related U.S. Application Data

(63) Continuation of application No. 15/146,971, filed on May 5, 2016, now Pat. No. 11,249,970.

(51) Int. Cl.
G06F 16/22    (2019.01)
G06F 16/23    (2019.01)
(Continued)

(52) U.S. Cl.
CPC ...... *G06F 16/2255* (2019.01); *G06F 16/2365* (2019.01); *G06F 16/2455* (2019.01); *G06F 16/9014* (2019.01)

(58) Field of Classification Search
CPC ............. G06F 16/2255; G06F 16/9014; G06F 16/2455; G06F 16/2365
See application file for complete search history.

(56) References Cited

U.S. PATENT DOCUMENTS 7,792,810 B1    9/2010 Kaminski
11,030,187 B1 *  6/2021 Boodman ............. G06F 16/235
(Continued)

FOREIGN PATENT DOCUMENTS

EP    1387292 A1    2/2004

OTHER PUBLICATIONS

China National Intellectual Property Administration, Notification to Go through Formalities of Registration in CN Application No. 2017800264618, dated Jul. 5, 2022, pp. 1-6.
(Continued)

*Primary Examiner* — Hares Jami
(74) *Attorney, Agent, or Firm* — Panitch Schwarze Belisario & Nadel LLP (57) ABSTRACT

A method for generating a universal distributed data storage includes: receiving a plurality of data values; generating a key for each of the plurality of data values, wherein the respective key is generated via application of a hashing algorithm to the associated data value; storing, in a database, each of the plurality of data values and the associated generated key as a plurality of key-value pairs; receiving a plurality of additional key-value pairs, wherein each value of the plurality of additional key-value pairs is not included in the plurality of data values; and storing, in the database, each of the plurality of additional key-value pairs, wherein each key included in the plurality of additional key-value pairs is generated via application of the hashing algorithm to the associated value and is not included in the keys generated for each of the plurality of data values.

16 Claims, 6 Drawing Sheets

(51) Int. Cl.
    *G06F 16/245* (2019.01)
    *G06F 16/2455* (2019.01)
    *G06F 16/901* (2019.01)

(56) References Cited

U.S. PATENT DOCUMENTS

| | | | | |
|---|---|---|---|---|
| 2005/0149627 A1* | 7/2005 | Schreter | ............. | G06F 16/2246 |
| | | | | 707/E17.032 |
| 2006/0271539 A1* | 11/2006 | Loeb | .................. | G06F 16/2255 |
| 2008/0140947 A1 | 6/2008 | Slik et al. | | |
| 2008/0148137 A1* | 6/2008 | Terao | ..................... | G06F 16/93 |
| | | | | 707/E17.008 |
| 2010/0036862 A1* | 2/2010 | Das | ........................ | G06F 16/86 |
| | | | | 707/698 |
| 2010/0257176 A1 | 10/2010 | Lu | | |
| 2011/0055169 A1 | 3/2011 | Yalamanchi | | |
| 2011/0099154 A1 | 4/2011 | Maydew et al. | | |
| 2013/0061036 A1* | 3/2013 | Oliver | ................ | H04L 63/0421 |
| | | | | 713/150 |
| 2013/0145170 A1 | 6/2013 | Rese et al. | | |
| 2013/0268770 A1* | 10/2013 | Hunt | ................... | G06F 16/2255 |
| | | | | 713/189 |
| 2014/0019680 A1* | 1/2014 | Jin | ..................... | G11B 20/1217 |
| | | | | 711/112 |
| 2014/0188790 A1 | 7/2014 | Hunter | | |
| 2015/0074115 A1 | 3/2015 | Vasu et al. | | |
| 2015/0161184 A1 | 6/2015 | Patiejunas et al. | | |
| 2015/0293937 A1* | 10/2015 | Zhang | ................ | G06F 16/1824 |
| | | | | 707/827 |
| 2016/0162508 A1* | 6/2016 | Brosch | ................. | G06F 16/137 |
| | | | | 707/692 |

OTHER PUBLICATIONS

Xi Li et al., "Satellite-Observed Nighttime Light Variation as Evidence for Global Armed Conflicts," IEEE Journal of Selected Topics in Applied Earth Observations and Remote Sensing, vol. 6, Issue 5, pp. 2302-2315, Apr. 16, 2013.

Notice of Decision, issued Dec. 20, 2022, in corresponding United Arab Emirates Application No. P6001538/18, 2 pps.

Examination Report, dated Dec. 18, 2022, issued in corresponding United Arab Emirates Application No. P6001538/18, 8 pps.

International Search Report and Written Opinion issued by the International Search Authority on May 15, 2017 in corresponding PCT Application No. PCT/US2017/024422 (14 pages).

Office Action (First Office Action) issued on Aug. 4, 2021, by the China National Intellectual Property Administration in corresponding Chinese Patent Application No. 201780026461.8 and an English Translation of the Office Action. (20 pages).

Office Action (Summons to attend oral proceedings pursuant to Rule 115(1) EPC) issued Nov. 11, 2021, by the European Patent Office in corresponding European Patent Application No. 17 715 891.2-1213. (10 pages).

Examination Report, dated Aug. 17, 2023, issued in corresponding Singapore Application No. 10202106015U, 4 pgs.

Extended European Search Report, dated Oct. 23, 2023, issued in corresponding European Application No. 23194847.2, 12 pages.

Wehrle et al: "Part III", Peer-to-Peer Systems and Applications Lecture Notes in Computer Science; LNCS, Sep. 29, 2005, pp. 79-153, XP093090843, Berlin, DE; ISBN: 978-3-540-29192-3.

* cited by examiner

METHOD AND SYSTEM FOR DISTRIBUTED DATA STORAGE WITH ETERNAL INTEGRITY GUARANTEES

FIELD

The present disclosure relates to the storage of data in a universal distributed data storage, specifically the use of collision-resistant hashing algorithms to generate keys for key-value storage for the storage of a virtually limitless data set with integrity guarantees.

BACKGROUND

Often times, when data is stored in a database it is associated with an identifier for easier access and identification. In many cases, the identifier assigned to a data value or set of data values may be unique to the associated data with respect to other identifiers used for all of the data stored in that particular group of data (e.g., a table of data) or database. Such identifier is often referred to as a "primary key," where the database may require each new data value or set of data values added to a table or database to have a unique primary key associated therewith for storage.

In many instances, primary keys must be unique to the individual table and/or database in question, but may be repeated throughout multiple tables or databases. For example, in many cases sets of data values in a table are assigned a number where the first set of data values begins at 1 or another predetermined value, with each new entry using the next number in sequence (e.g., 2, 3, 4, etc.). Other tables in the same database may use the same numbering system, where multiple sets of data values in a database may each be assigned the same identifying number (e.g., 1), but where the identifying number may be unique for the respective table in the database (e.g., each table only has a single set of data values with the assigned identifier of "1").

Such a system, which may be useful for smaller databases, may be detrimental in instances where two data sets may be combined, particularly when multiple entities are involved. For example, two companies may have a need to exchange sets of documents stored in internal storage. Each company may use the same numbering system for identification, which may result in multiple documents having conflicting identifiers. As a result, either the documents must be stored in separate tables and/or databases, or identifiers must be modified for one or both of the sets. In the former instance, it may be difficult to make adjustments to both tables/databases at once and may be inconvenient for the purposes of sorting and storage. In the latter instance, the two parties must both agree on the alternative identification with one or both parties modifying their previous identification system accordingly, which can be highly inconvenient and potentially detrimental due to the prevailing use of the identifiers in the rest of their business. In addition, any future changes to identifiers, such as due to changing in business practices, or in an instance where a deal is struck with a third entity with whom there are conflicting identifiers, must be propagated to the other entity. As entities communicate and deal with more and more entities, the conflicts may compound where changes to identifiers may occur at an unreasonable rate and negatively affect each entity's ability to do business.

Thus, there is a need for a technical solution to enable a universal distributed data storage where every data set, regardless of entity, type of data, method of storage, etc. can be combined without any collisions in identification, and where the integrity is not affected by future additions of data to the data set.

SUMMARY

The present disclosure provides a description of systems and methods for generation of a universal distributed data storage. The use of collision-resistant hashing to develop identification values for disparate data sets may enable the combination of data sets without collisions and may preserve integrity of the data sets and their identification following any future combination of additional data sets into the universal data storage.

A method for generating a universal distributed data storage includes: receiving, by a receiving device of a processing server, a data signal superimposed with a plurality of data values; generating, by a hashing module of the processing server, a key for each of the plurality of data values, wherein the respective key is generated via application of a hashing algorithm to the associated data value; executing, by a querying module of the processing server, a first query on a database of the processing server to store each of the plurality of data values and the associated generated key as a plurality of key-value pairs; receiving, by the receiving device of the processing server, a data signal superimposed with a plurality of additional key-value pairs, wherein each value of the plurality of additional key-value pairs is not included in the plurality of data values; and executing, by the querying module of the processing server, a second query on the database of the processing server to store each of the plurality of additional key-value pairs, wherein each key included in the plurality of additional key-value pairs is generated via application of the hashing algorithm to the associated value and is not included in the keys generated for each of the plurality of data values.

A system for generating a universal distributed data storage includes: a database of a processing server; a receiving device of the processing server configured to receive a data signal superimposed with a plurality of data values; a hashing module of the processing server configured to generate a key for each of the plurality of data values, wherein the respective key is generated via application of a hashing algorithm to the associated data value; and a querying module of the processing server configured to execute a first query on a database of the processing server to store each of the plurality of data values and the associated generated key as a plurality of key-value pairs. The receiving device of the processing server is further configured to receive a data signal superimposed with a plurality of additional key-value pairs, wherein each value of the plurality of additional key-value pairs is not included in the plurality of data values. The querying module of the processing server is further configured to execute a second query on the database of the processing server to store each of the plurality of additional key-value pairs, wherein each key included in the plurality of additional key-value pairs is generated via application of the hashing algorithm to the associated value and is not included in the keys generated for each of the plurality of data values.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Universal Distributed Data Storage

Figure 1:
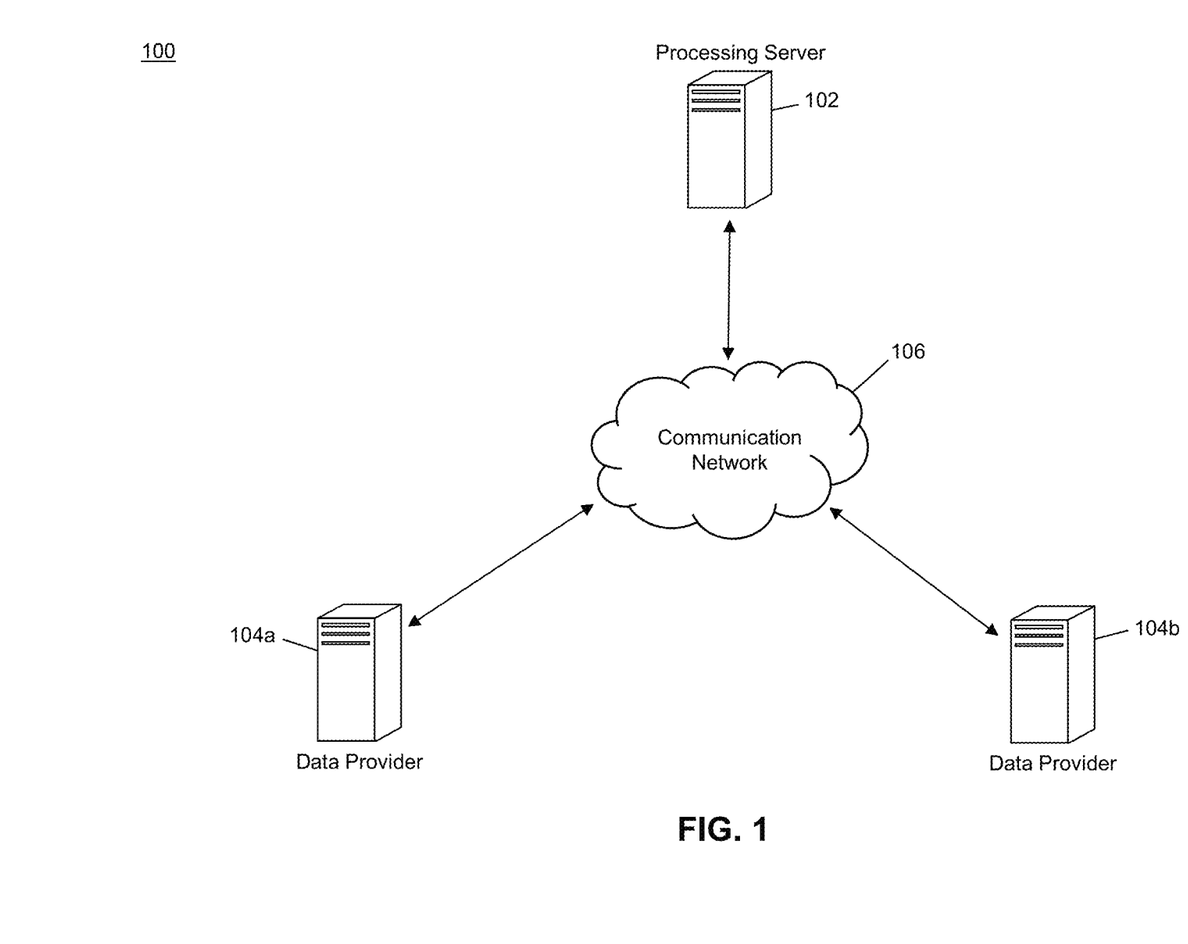
FIG. 1 is a block diagram illustrating a high level system architecture for the generation of a universal distributed data storage in accordance with exemplary embodiments.

FIG. 1 illustrates a system 100 for the generation of a universal distributed data storage.

The system 100 may include a processing server 102. The processing server 102, discussed in more detail below, may be configured to combine data sets as part of a universal distributed data storage. The processing server 102 may receive data sets from a plurality of different data providers 104, illustrated in FIG. 1 as data providers 104a and 104b. Each data provider 104 may electronically transmit data sets to the processing server 102 for inclusion in the universal data storage via a communication network 106.

The communication network 106 may be any type of communication network suitable for performing the functions discussed herein. For example, the communication network 106 may be a local area network, wireless area network, the Internet, a radio frequency network, a cellular communication network, etc., and utilize any suitable protocol for accomplishing the transmission of data therewith. In some instances, communications between a data provider 104 and the processing server 102 may utilize a plurality of communication networks 106, such as a combination of two or more separate communication networks 106. For example, the data provider 104 may electronically transmit a data set to a first computing device via a local area network, which may forward the data set to a second computing device via the Internet, which may forward the data set to the processing server 102 via another local area network.

In some instances, data sets electronically transmitted by a data provider 104 to the processing server 102 may be superimposed or otherwise encoded on a data signal that is electronically transmitted via the communication network 106. The processing server 102 may receive the data signal and may parse the data set therefrom using suitable methods and systems. In some instances, a data set may be superimposed or otherwise encoded on a single data signal, or may be superimposed or otherwise encoded on a plurality of different data signals electronically transmitted to the processing server 102. For example, a data set may be comprised of a plurality of different data values, each being superimposed on a separate data signal, for receipt by the processing server 102. In some such instances, multiple data signals may be used due to bandwidth and/or data size limitations.

Data sets electronically transmitted to the processing server 102 by the data providers 104 may be comprised of a plurality of different data values. Each data value may be comprised of data in any format suitable for transmission to the processing server 102. For example, a data value may be a set or string of hexadecimal or other type of characters, may be an integer or floating point number, may be a data file of any format, etc. In some instances, the processing server 102 may be configured to receive any data value, regardless of formatting, file type, file size, etc., for storage in the universal data storage. For example, the set of data values provided by a data provider 104 may include an alphanumeric character string, a database file, an image file, a document file, a video file, and/or multiple numeric values. The processing server 102 may be configured to combine data sets of data values of varying data values, such that any two data sets may have a different number of data values with the data sets being comprised of different types of data values.

The processing server 102 may receive a set of data values from a data provider 104 and may generate keys for each data value. A key may be generated by the processing server 102 via the application of a hashing algorithm to the respective data value. The hashing algorithm may be a collision-resistant hash algorithm, such as the secure hash algorithm (SHA) SHA-256 or SHA-512. A collision-resistant hash algorithm may be an algorithm such that the hash values produced via the use thereof may be highly resistant to collisions. In such cases, the hash value produced by the processing server 102 for any data value may be unique to that data value when compared to the hash value generated for virtually any other possible data value.

Once a key is generated for each data value, the processing server 102 may store the data values and corresponding keys into a data storage as a plurality of key-value pairs. The processing server 102 may then repeat the process for one or more additional data sets, which may be received from the same data provider 104 or from one or more other data providers 104 via the communication network 106. Due to the use of a collision-resistant hashing algorithm, each key generated for the data values has a near infinite likelihood of being unique to that data value with respect to all of the other keys stored in the data storage. As such, the key-value pairs for each set of data values may be stored in the data storage without modification to existing key-value pairs and without collision among keys. In addition, the integrity of key-value pairs stored in the data storage may be eternal due to the uniqueness of the keys via the collision-resistant hashing algorithm.

The methods and systems discussed herein may thus enable the processing server 102 to generate a data storage that is capable of storing a virtually infinite amount of data values for a virtually infinite amount of time without collision and without compromising key integrity. As such, the data storage generated by the processing server 102 may be a universal data storage in the sense that any data storage that uses the same collision-resistant hashing algorithm to generate the keys may be combined together without collision, making each data storage a piece of a universal data storage.

The universal data storage generated by the processing server 102 using the methods discussed herein may provide for easier and more efficient sharing of data between two entities. For example, a first and second entity may each exchange documents that are stored as values in key-value pairs in the universal data storage. As each document is generated a unique key, the documents may be exchanged and stored without collision and without having an adverse effect on any additional data that is stored or data storage schemes used by each entity. In addition, each entity may refer to a document using its unique key, which may ensure that each entity identifies the correct document due to the uniqueness of the associated key. Such benefits may have even greater effectiveness when additional entities are involved. The use of keys generated via a hashing algorithm is also beneficial as it may provide for higher security against data theft, as two entities may exchange a key as a reference to a data value, where the key may be compromised without endangering the associated data value due to the inability to determine the data value from the key without already possessing the key-value pair.

In addition, the use of the universal data storage may also provide for more efficient changes in keys than in traditional systems. In traditional systems, if an entity wants to modify their identification scheme for data, they must inform every entity that shares that data of the change in identification. Each of those entities must then modify their identification of that data, which may result in collisions that may cause further changes, which may need to be communicated to other entities, and continuing on until all collisions among all entities are resolved. With the use of the universal data storage, a new collision-resistant hash algorithm may be used to generate new keys for each data value, which may be performed independently by every entity that stores key-value pairs for any of the data values. The rehashing of the data values to generate new keys may also be performed without the exchange of any data values or associated keys, which may thus provide for significantly faster and more efficient conversion of keys for data values.

Processing Server

Figure 2:
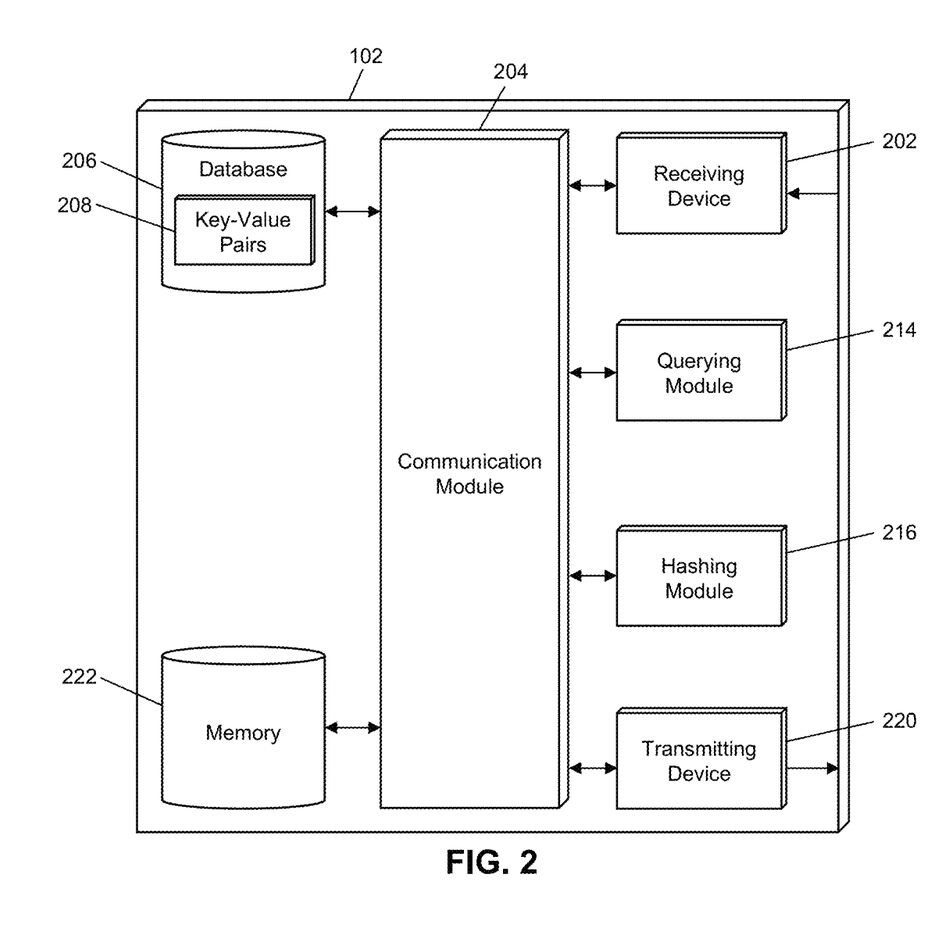
FIG. 2 is a block diagram illustrating the processing server of FIG. 1 for the generation of a universal distributed data storage in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over one or more communication networks 106 using protocols and infrastructure associated therewith. The receiving device 202 may be configured to receive data from data providers 104 and other entities via one or more different communication networks 106, which may utilize the same or varying communication protocols. In some embodiments, the receiving device 202 may be comprised of multiple devices, such as different receiving devices for receiving data over different networks, such as a first receiving device for receiving data over a local area network and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by data providers 104 that are superimposed or otherwise encoded with data values. The data values may be any type of data value of any type of data format and data size that may be suitable for the application of a hashing algorithm thereto for the generation of a hash value as a corresponding key. The receiving device 202 may also be configured to receive data signals from data providers 104 that are superimposed with rehashing requests, which may request use of an alternative hash algorithm or hash digest and/or may specify the alternative hash algorithm or hash digest, or data requests. Data requests may include one or more keys for which corresponding data values are requested.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, hashing module 216, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a database 206. The database 206 may be configured to store a plurality of key-value pairs 208 using a suitable data storage format and schema. The database 206 may be a relational database that utilizes structured query language for the storage, identification, modifying, updating, accessing, etc. of structured data sets stored therein. Each key-value pair 208 may be a structured data set configured to a data value of any type, format, size, etc. and a key generated thereby. The database 206 may be part of a universal data storage such that each key-value pair 208 stored therein may have a key that is unique for virtually any other data value that may potentially be stored in the database 206.

The processing server 102 may include a querying module 214. The querying module 214 may be configured to execute queries on databases to identify information. The querying module 214 may receive one or more data values or query strings, and may execute a query string based thereon on an indicated database, such as the database 206, to identify information stored therein or perform any other functions related to management of the indicated database. The querying module 214 may then output the identified information, or a result of the executed query, to an appropriate engine or module of the processing server 102 as necessary. The querying module 214 may, for example, execute a query on the database 206 to identify a data value in a key-value pair 208 based on a provided key, to store a new key-value pair 208 in the database 206 for a newly received data value, or to modify the existing key for a data value, such as generated as a result of a request for rehashing.

The processing server 102 may also include a hashing module 216. The hashing module 216 may be configured to generate hash values from provided data via the application of a hashing algorithm to the data. The hashing module 216 may receive a data value, may apply a hashing algorithm to the data value, and output the generated hash value to one or more modules or engines of the processing server 102. In some instances, the hashing module 216 may receive an indication of the hashing algorithm and/or an associated hash digest to use along with the data value. In other instances, the hashing module 216 may identify the hashing algorithm and/or hash digest to use when hashing the provided data value. In exemplary embodiments, the hashing module 216 may be configured to generate a hash value as a key in a key-value pair 208 for a data value via the use of a collision-resistant hash algorithm, such as the SHA-256 algorithm or SHA-512 algorithm.

The processing server 102 may also include a transmitting device 220. The transmitting device 220 may be configured to transmit data over one or more networks via one or more network protocols. In some embodiments, the transmitting device 220 may be configured to transmit data over one or more communication networks 106 using protocols and infrastructure associated therewith. The transmitting device 220 may be configured to electronically transmit data to data providers 104 and other entities via one or more different communication networks 106, which may utilize the same or varying communication protocols. In some embodiments, the transmitting device 220 may be comprised of multiple devices, such as different transmitting devices for transmitting data over different networks, such as a first transmitting device for transmitting data over a local area network and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to data providers 104 that may be superimposed with keys, data values, hashing algorithms and/or digests, or other suitable data. For example, the transmitting device 220 may electronically transmit a data signal superimposed or otherwise encoded with data values to a data provider 104 in response to a received data request comprising the corresponding keys. In another example, the transmitting device 220 may electronically transmit a data signal superimposed or otherwise encoded with a new hashing algorithm to a data provider 104 used for the generation of keys for key-value pairs 208, such as for use in rehashing of the keys.

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein.

Process for Generating Keys in a Universal Data Storage

Figure 3:
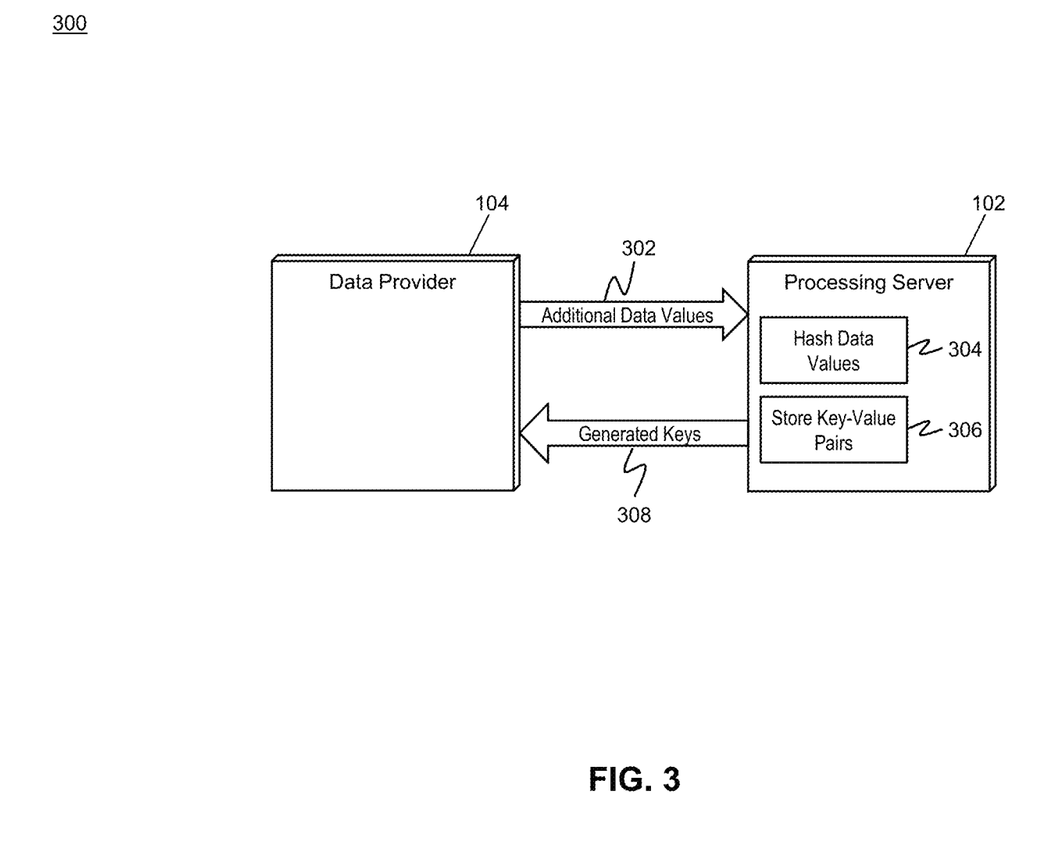
FIG. 3 is a flow diagram illustrating a process for the addition of a data set to a universal distributed data storage using the system of FIG. 1 in accordance with exemplary embodiments.

FIG. 3 illustrates a process 300 for the generation of keys by the processing server 102 for a universal data storage for providing to a data provider 104 for use in the storage and identification of data without collisions and while maintaining eternal integrity.

In step 302, the data provider 104 may electronically transmit a data signal to the processing server 102 via the communication network 106 that is superimposed or otherwise encoded with a plurality of additional data values for which keys are requested. The data values may be any type of data in any suitable data format of any data size. The receiving device 202 of the processing server 102 may receive the data signal from the data provider 104 and parse the signal to obtain the data values encoded thereon.

In step 304, the hashing module 216 of the processing server 102 may hash each of the data values provided by the data provider 104 to generate a key for each data value. The hashing of each data value may include the application of a hashing algorithm to the respective data value to generate the resulting key as a hash value. In an exemplary embodiment, the hashing algorithm may be a collision-resistant hash algorithm, such as the SHA-256 algorithm. In step 306, the querying module 214 of the processing server 102 may execute a query on the database 206 of the processing server 102 to store, for each additional data value provided by the data provider 104, a new key-value pair 208 therein. Each new key-value pair 208 may include the respective additional data value and the corresponding key generated by the hashing module 216.

In step 308, the transmitting device 220 of the processing server 102 may electronically transmit a data signal back to the data provider 104 via the communication network 106 that is superimposed or otherwise encoded with the keys generated for each of the additional data values. In some embodiments, the keys may be accompanied with the corresponding data values for use by the data provider 104 for the identification thereof. In some instances, the keys may be accompanied by, or replaced by, the hashing algorithm and/or an associated hash digest used by the hashing module 216 in the generation of the corresponding keys. In such instances, the data provider 104 may be able to generate a key for reference of data value when necessary via the hashing algorithm used by the hashing module 216.

Combination and Sorting of Universal Data Storage

Figure 4:
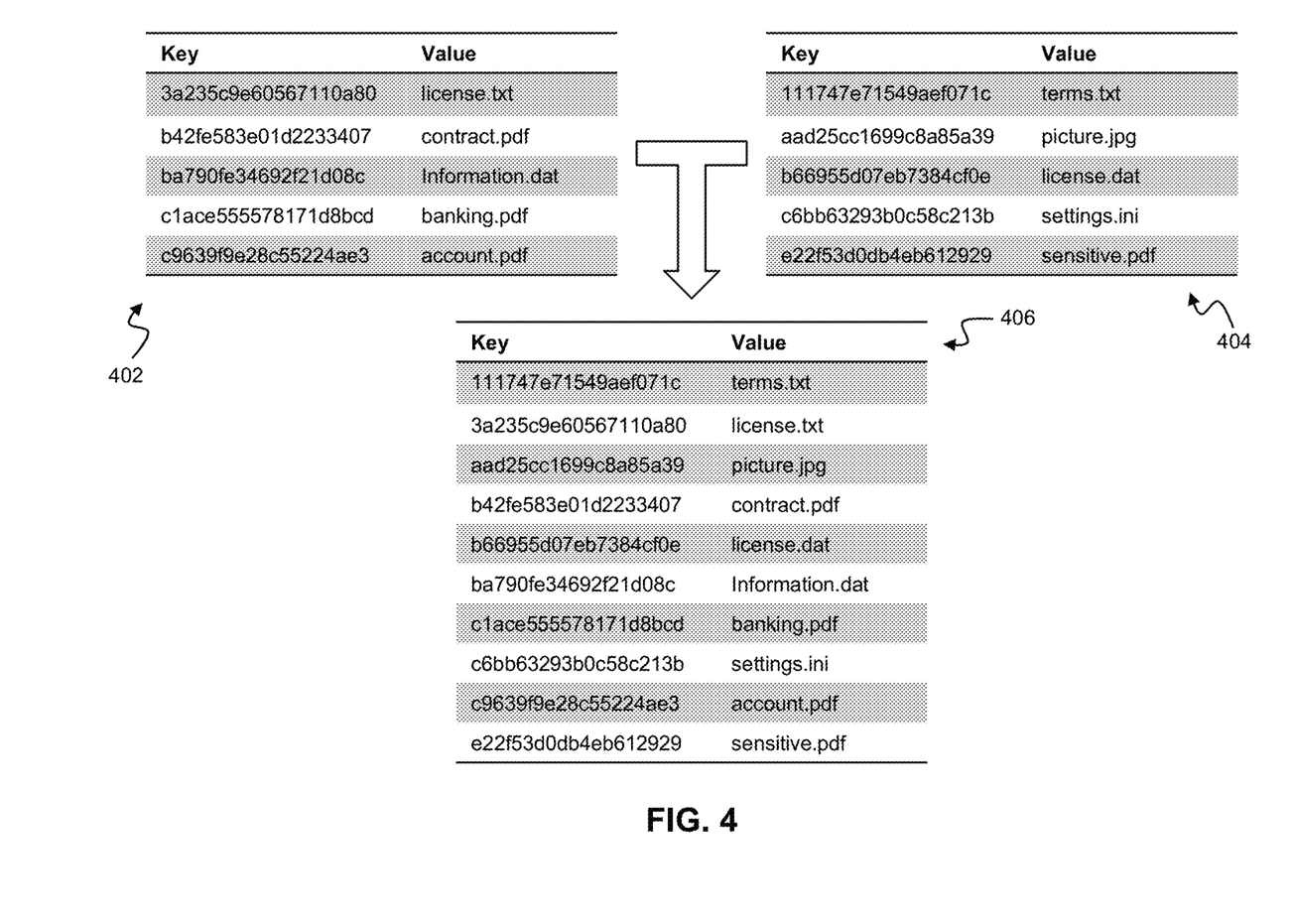
FIG. 4 is a diagram illustrating the combination of two disparate data sets in a universal data storage in accordance with exemplary embodiments.

FIG. 4 illustrates the combination of two portions of a universal data storage into a single data storage without collisions, as well as the sorting thereof based on the uniquely generated keys.

As illustrated in FIG. 4, the processing server 102 may combine a first data set 402 with a second data set 404. Each data set 402 and 404 may be comprised of a plurality of key-value pairs 208, and may be a portion of or may comprise a database 206 that is to be combined together. In some instances, a data set 402 or 404 may be the key value-pairs 208 stored in the database 206, while the other data set 404 or 402, respectively, may be comprised of key-value pairs 208 generated by the hashing module 216 and querying module 214 of the processing server 102 based on a data set provided by a data provider 104 and received via the receiving device 202.

Each of the key value-pairs 208 comprising each of the data sets 402 and 404 may be comprised of a key and a corresponding data value. As illustrated in FIG. 4, each data value may be of a different data type and format, which may include, in the illustrated example, a mix of image, document, data, and initialization files, which may each be of a different data size. The key in each key-value pair 208 may be a key generated via the application of a collision-resistant hashing algorithm to the corresponding data value. It will be apparent to persons having skill in the relevant art that the keys illustrated in FIG. 4 are provided for illustrative purposes, and that keys generated by the hashing module 216 using the collision-resistant hashing algorithm may be of a different length and make up of characters.

The processing server 102 may combine each of the data sets 402 and 404 into a single data set 406. The single data set 406 may include each of the key-value pairs 208 included in both of the individual data sets 402 and 404. As illustrated in FIG. 4, the querying module 214 of the processing server 102 may execute a query on the single data set 406 for the sorting thereof. In the illustrated example, the key-value pairs 208 may be stored by their respective keys. Due to the uniqueness of each key, the key-value pairs 208 may be sorted in such a way that any entity (e.g., a data provider 104) that possesses the same data values may achieve the same sorting. As a result, multiple entities having the same data values may possess the same corresponding set of key-value pairs 208 without exchange of the actual data values, which may provide for more efficient and effective future communications via the keys.

Exemplary Method for Generating a Universal Distributed Data Storage

Figure 5:
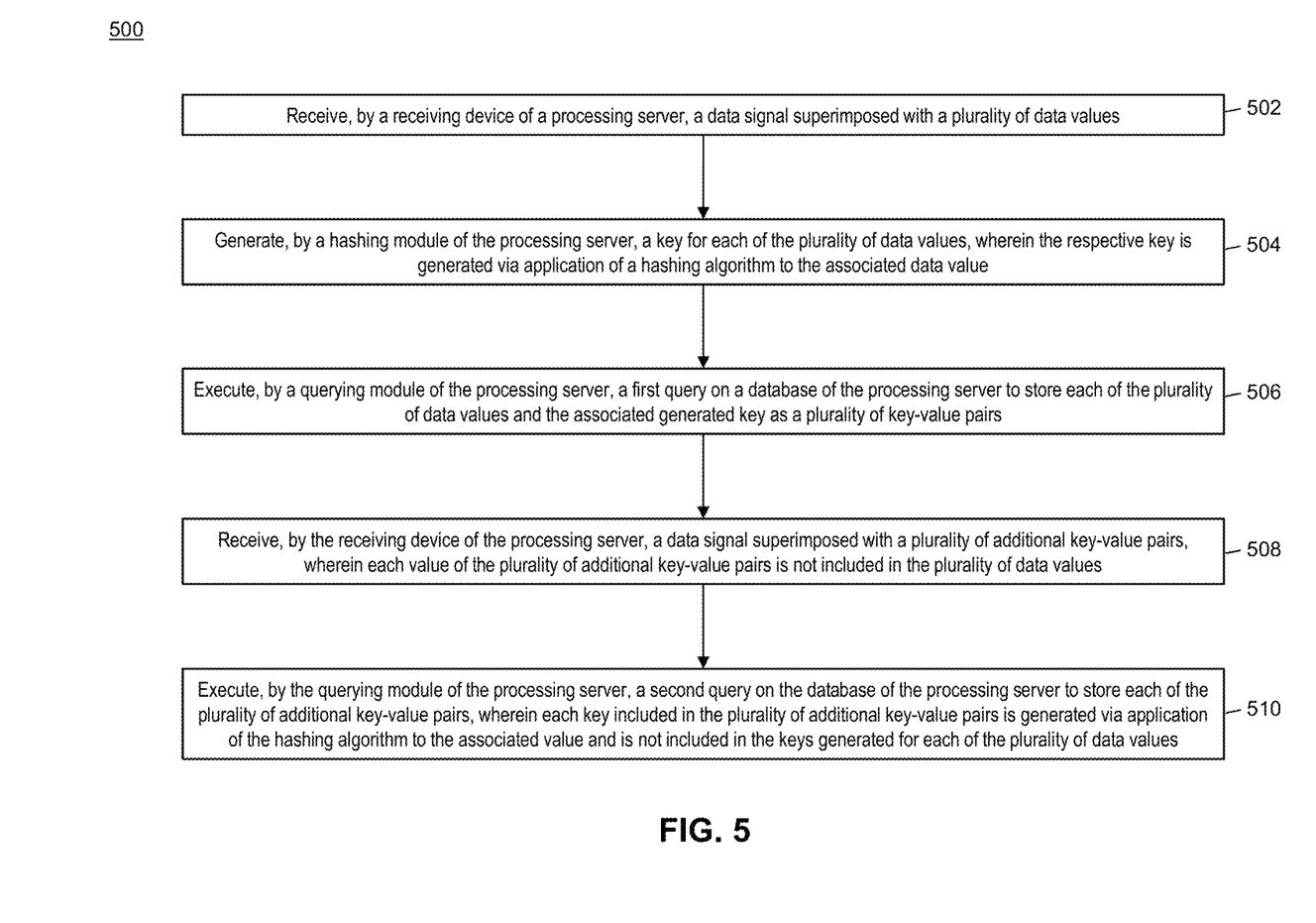
FIG. 5 is a flow chart illustrating an exemplary method for generating a universal distributed data storage in accordance with exemplary embodiments.

FIG. 5 illustrates a method 500 for the generation of a universal distributed data storage via the use of a hashing algorithm for the generation of keys for data values of disparate data sets.

In step 502, a data signal superimposed with a plurality of data values may be received by a receiving device (e.g., the receiving device 202) of a processing server (e.g., the processing server 102). In step 504, a hashing module (e.g., the hashing module 216) of the processing server may generate a key for each of the plurality of data values, wherein the respective key is generated via application of a hashing algorithm to the associated data value. In step 506, a first query may be executed on a database (e.g., the database 206) of the processing server by a querying module (e.g., the querying module 214) of the processing server to store each of the plurality of data values and the associated generated key as a plurality of key-value pairs (e.g., key-value pairs 208).

In step 508, a data signal superimposed with a plurality of additional key-value pairs may be received by the receiving device of the processing server, wherein each value of the plurality of additional key-value pairs is not included in the plurality of data values. In step 510, a second query may be executed by the querying module of the processing server on the database of the processing server to store each of the plurality of additional key-value pairs, wherein each key included in the plurality of additional key-value pairs is generated via application of the hashing algorithm to the associated value and is not included in the keys generated for each of the plurality of data values.

In one embodiment, the hashing algorithm may be a collision-resistant algorithm. In a further embodiment, the hashing algorithm may be an SHA-256 algorithm. In some embodiments, the method 500 may further include executing, by the querying module of the processing server, a third query on the database of the processing server to sort the plurality of key-value pairs and plurality of additional key-value pairs based on the respective key.

In one embodiment, the method 500 may also include: receiving, by the receiving device of the processing server, a data signal superimposed with a rehash request, wherein the rehash request indicates a different hashing algorithm; generating, by the hashing module of the processing server, a new key for each of the plurality of data values and each value included in the plurality of additional key-value pairs; and executing, by the querying module of the processing server, a third query on the database of the processing server to replace the key in each of the plurality of key-value pairs and plurality of additional key-value pairs with the respective generated new key. In a further embodiment, the method 500 may even further include executing, by the querying module of the processing server, a fourth query on the database of the processing server to sort the plurality of key-value pairs and plurality of additional key-value pairs based on the respective generated new key. In another further embodiment, the different hashing algorithm may be a collision-resistant hashing algorithm. In an even further embodiment, the hashing algorithm may be an SHA-256 algorithm.

In some embodiments, the method 500 may further include: receiving, by the receiving device of the processing server, a data signal superimposed with a value request, wherein the value request includes at least a requesting key; executing, by the querying module of the processing server, a third query on the database of the processing server to identify a specific key-value pair where the key corresponds to the requesting key; and electronically transmitting, by a transmitting device of the processing server, a data signal superimposed with at least the value included in the identified specific key-value pair in response to the received value request. In one embodiment, the hashing algorithm may be such that each generated key is unique with respect to all other generated keys.

Computer System Architecture

Figure 6:
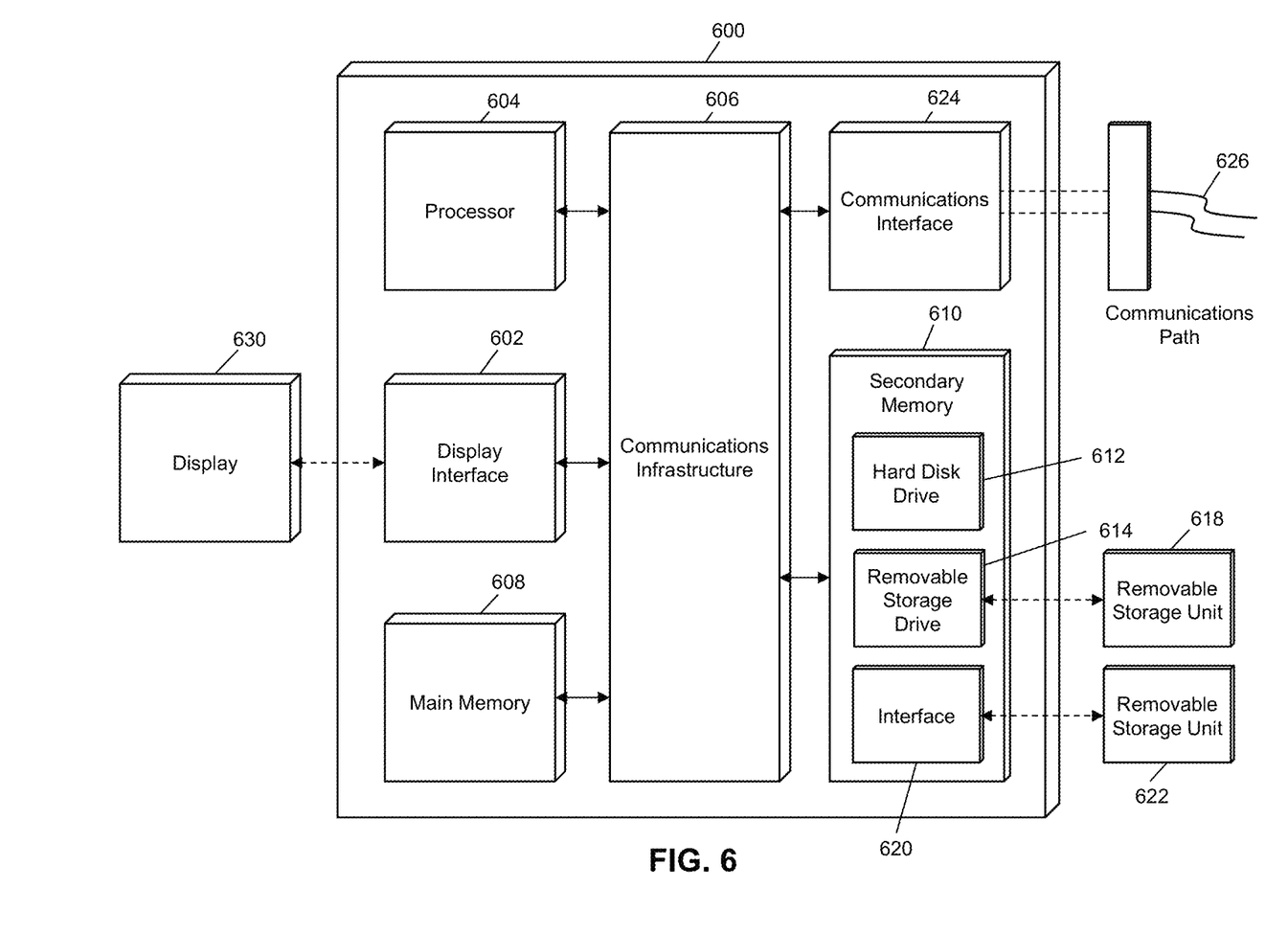
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3 and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for generating a universal distributed data storage. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for generating a universal distributed data storage, comprising:
   receiving, by a processing server, a data signal superimposed with a plurality of data values from two or more data sets to be combined into a single data storage without collisions;
   generating, by the processing server, a key for each of the plurality of data values, wherein the respective key is generated via application of a collision-resistant hashing algorithm to an associated data value;
   executing, by the processing server, a first query on a database of the processing server to store each of the plurality of data values and an associated generated key in the database of the processing server as a plurality of key-value pairs;
   receiving, by the processing server, a data signal superimposed with a plurality of additional key-value pairs;
   executing, by the processing server, a second query on the database of the processing server to store each of the plurality of additional key-value pairs in the database of the processing server, wherein each key included in the plurality of additional key-value pairs is generated via application of the collision-resistant hashing algorithm to the associated data value;
   receiving, by the processing server, from an external system via a communication network, a data signal superimposed with a rehash request that indicates a hashing algorithm different from the collision-resistant hashing algorithm; and
   without requiring exchanging the data values or associated keys, generating, by the processing server, a new key for each of the plurality of data values and each value included in the plurality of additional key-value pairs by rehashing the data values using the hashing algorithm received from the external system.

2. The method of claim 1, wherein the collision-resistant hashing algorithm is an SHA-256 algorithm.

3. The method of claim 1, further comprising:
   executing, by the processing server, a third query on the database of the processing server to sort the plurality of key-value pairs and plurality of additional key-value pairs based on the respective key.

4. The method of claim 3, further comprising:
   executing, by the processing server, a fourth query on the database of the processing server to replace the key in each of the plurality of key-value pairs and plurality of additional key-value pairs with the respective generated new key.

5. The method of claim 1, wherein the different hashing algorithm is a collision-resistant hashing algorithm.

6. The method of claim 5, wherein the collision-resistant hashing algorithm of the different hashing algorithm is an SHA-256 algorithm.

7. The method of claim 1, wherein the collision-resistant hashing algorithm is such that each generated key is unique with respect to all other generated keys.

8. The method of claim 1, wherein the database of the processing server is a key-value database, and the generated key is a key in the key-value pair and the data value is a value in the key-value pair.

9. A system for generating a universal distributed data storage, comprising:
   a database of a processing server;
   a processing server configured to:
     receive a data signal superimposed with a plurality of data values from two or more data sets to be combined into a single data storage without collisions;
     generate a key for each of the plurality of data values, wherein the respective key is generated via application of a collision-resistant hashing algorithm to an associated data value;
     execute a first query on a database of the processing server to store each of the plurality of data values and an associated generated key in the database of the processing server as a plurality of key-value pairs;
     receive a data signal superimposed with a plurality of additional key-value pairs;
     execute a second query on the database of the processing server to store each of the plurality of additional key-value pairs in the database of the processing server, wherein each key included in the plurality of additional key-value pairs is generated via application of the collision-resistant hashing algorithm to the associated value;
     receive from an external system, via a communication network, a data signal superimposed with a rehash request that indicates a hashing algorithm different from the collision-resistant hashing algorithm; and
     generate, without requiring exchanging the data values or associated keys, a new key for each of the plurality of data values and each value included in the plurality of additional key-value pairs by rehashing the data values using the hashing algorithm received from the external system.

10. The system of claim 9, wherein the collision-resistant hashing algorithm is an SHA-256 algorithm.

11. The system of claim 9, wherein the processing server is further configured to:
execute a third query on the database of the processing server to sort the plurality of key-value pairs and plurality of additional key-value pairs based on the respective key.

12. The system of claim 11, wherein the processing server is further configured to:
execute a fourth query on the database of the processing server to replace the key in each of the plurality of key-value pairs and plurality of additional key-value pairs with the respective generated new key.

13. The system of claim 9, wherein the different hashing algorithm is a collision-resistant hashing algorithm.

14. The system of claim 13, wherein the collision-resistant hashing algorithm of the different hashing algorithm is an SHA-256 algorithm.

15. The system of claim 9, wherein the collision-resistant hashing algorithm is such that each generated key is unique with respect to all other generated keys.

16. The system of claim 9, wherein the database of the processing server is a key-value database, and the generated key is a key in the key-value pair and the data value is a value in the key-value pair.

* * * * *